United States Patent
Utsunomiya

(10) Patent No.: US 10,418,730 B2
(45) Date of Patent: Sep. 17, 2019

(54) CABLE CONNECTION STRUCTURE AND MANUFACTURING METHOD THEREFOR

(71) Applicants: FURUKAWA ELECTRIC CO., LTD., Tokyo (JP); FURUKAWA AUTOMOTIVE SYSTEMS INC., Shiga (JP)

(72) Inventor: Hirofumi Utsunomiya, Shiga (JP)

(73) Assignees: FURUKAWA ELECTRIC CO., LTD., Tokyo (JP); FURUKAWA AUTOMOTIVE SYSTEMS INC., Shiga (JP)

(*) Notice: Subject to any disclaimer, the term of this patent is extended or adjusted under 35 U.S.C. 154(b) by 50 days.

(21) Appl. No.: 15/560,151

(22) PCT Filed: Mar. 18, 2016

(86) PCT No.: PCT/JP2016/001596
§ 371 (c)(1),
(2) Date: Sep. 20, 2017

(87) PCT Pub. No.: WO2016/152134
PCT Pub. Date: Sep. 29, 2016

(65) Prior Publication Data
US 2018/0083376 A1 Mar. 22, 2018

(30) Foreign Application Priority Data
Mar. 23, 2015 (JP) .................. 2015-060041

(51) Int. Cl.
*H01R 12/65* (2011.01)
*H01R 12/59* (2011.01)
(Continued)

(52) U.S. Cl.
CPC ............. *H01R 12/65* (2013.01); *H01R 12/59* (2013.01); *H01R 12/77* (2013.01); *H01R 35/025* (2013.01);
(Continued)

(58) Field of Classification Search
CPC ........ H01R 12/59; H01R 12/65; H01R 12/77; H01R 35/025; H01R 43/00; H01R 43/0214; H01R 43/20; H02B 1/202
See application file for complete search history.

(56) References Cited

U.S. PATENT DOCUMENTS 3,461,221 A * 8/1969 Herb .................. H01R 4/10
174/84 C
4,256,359 A * 3/1981 Storck .................... H01R 12/68
174/78
(Continued)

FOREIGN PATENT DOCUMENTS

CN 102122769 A 7/2011
CN 102684029 A 9/2012
(Continued)

OTHER PUBLICATIONS

International Search Report for PCT Application No. PCT/JP2016/001596, dated Jun. 14, 2016, 7 pages.
(Continued)

*Primary Examiner* — Timothy J Thompson
*Assistant Examiner* — Rhadames Alonzo Miller
(74) *Attorney, Agent, or Firm* — Amin, Turocy & Watson, LLP

(57) ABSTRACT

[Problems] A cable connecting structure for connecting bus bars and an insulating part with a simple configuration is provided.
[Means for solving the problems] The cable connecting structure includes a plurality of bus bars (60), a flexible flat
(Continued)

cable (14), and an insulating part (40). The flexible flat cable (14) is connected to the bus bars (60). The insulating part (40) has bus bar mounting grooves (41) for arranging the bus bars (60) individually and a bus bar fixing portion (45) for fixing the bus bars (60) by overlapping the bus bars (60). A triangular protrusion (62) that protrudes toward a side where the flexible flat cable (14) is mounted is formed in each of the bus bars (60). The flexible flat cable (14) is connected to the triangular protrusion (62) in each of the bus bars (60).

13 Claims, 9 Drawing Sheets

(51) Int. Cl.
*H01R 12/77* (2011.01)
*H01R 35/04* (2006.01)
*H01R 43/00* (2006.01)
*H01R 35/02* (2006.01)
*H01R 43/20* (2006.01)
*H02B 1/20* (2006.01)
*B60R 16/027* (2006.01)
*H01R 43/02* (2006.01)
*H01R 43/18* (2006.01)

(52) U.S. Cl.
CPC ........... *H01R 35/04* (2013.01); *H01R 43/00* (2013.01); *H01R 43/20* (2013.01); *H02B 1/202* (2013.01); *B60R 16/027* (2013.01); *H01R 43/0214* (2013.01); *H01R 43/18* (2013.01)

(56) References Cited

U.S. PATENT DOCUMENTS

| | | | | |
|---|---|---|---|---|
| 5,728,975 | A | * | 3/1998 | Tanaka .................. H01R 12/62 174/88 B |
| 5,762,507 | A | * | 6/1998 | Mochizuki ........... H01R 35/025 439/15 |
| 5,824,955 | A | | 10/1998 | Saiso |
| 5,944,553 | A | * | 8/1999 | Yasui .................. B60R 16/0215 439/492 |
| 6,023,022 | A | | 2/2000 | Nakamura et al. |
| 6,232,556 | B1 | | 5/2001 | Daugherty et al. |
| 8,382,512 | B2 | | 2/2013 | Morita |
| 8,678,835 | B2 | | 3/2014 | Takahashi et al. |
| 2002/0041496 | A1 | * | 4/2002 | Hatagishi ................. B60Q 3/82 362/488 |
| 2003/0054682 | A1 | | 3/2003 | Sugata |
| 2004/0023536 | A1 | * | 2/2004 | Maegawa ............. B60R 16/027 439/164 |
| 2004/0102103 | A1 | * | 5/2004 | Kling ................... H01R 13/055 439/692 |
| 2007/0031646 | A1 | * | 2/2007 | Yamazaki ............... B29C 43/18 428/212 |
| 2008/0256781 | A1 | * | 10/2008 | Murakami ........... B21D 39/032 29/524.1 |
| 2011/0130030 | A1 | | 6/2011 | Morita |
| 2012/0238112 | A1 | * | 9/2012 | Takahashi ............ H01R 12/592 439/13 |

FOREIGN PATENT DOCUMENTS

| | | |
|---|---|---|
| CN | 102891277 A | 1/2013 |
| CN | 103515750 A | 1/2014 |
| EP | 2500994 A1 | 9/2012 |
| JP | H09199196 A | 7/1997 |
| JP | H11-31542 A | 2/1999 |
| JP | 2003086321 A | 3/2003 |
| JP | 2006-325366 A | 11/2006 |
| JP | 2011134702 A | 7/2011 |
| JP | 2012182072 | 9/2012 |
| JP | 2012209254 A | 10/2012 |
| JP | 2013-525994 | 6/2013 |
| JP | 3183930 U | 6/2013 |
| JP | 2013187150 A | 9/2013 |

OTHER PUBLICATIONS

European Search Report dated Sep. 26, 2018 for European Application No. 16768041.2, 8 pages.
Chinese Office Action dated Aug. 17, 2018 for Chinese Patent Application No. 201680006295.0, 19 pages (with translation).
Japanese Office Action dated Sep. 10, 2018 for Japanese Patent Application No. 2015-060041, 7 pages (with translation).
Japanese Office Action dated Nov. 15, 2018 for Japanese Patent Application No. 2015-060041, 6 pages (with translation).

* cited by examiner (a)

(b)

(a)

(b)

CABLE CONNECTION STRUCTURE AND MANUFACTURING METHOD THEREFOR

RELATED APPLICATIONS

This patent application is a U.S. National Stage filing under 35 USC § 371 of international Patent Cooperation Treaty (PCT) Application No. PCT/JP2016/001596, filed Mar. 18, 2016, and entitled "CABLE CONNECTION STRUCTURE AND MANUFACTURING METHOD THEREFOR," which claims priority to Japanese Patent Application No. JP2015-060041, filed Mar. 23, 2015, the disclosures of which applications are hereby incorporated by reference herein in their respective entireties.

TECHNICAL FIELD

The present invention mainly relates to a connecting tool provided in a rotary connector device.

BACKGROUND ART

Conventionally known is a rotary connector device for electrically connecting a rotatable side and a fixed side, such as a steering side and a vehicle body side of a vehicle, to each other. In general, a steering of a vehicle is provided with a device, such as an airbag, that is required to ensure a reliable operation in an emergency situation. Accordingly, not a sliding electrode or the like having low reliability but a rotary connector configured to connect a steering side and a vehicle body side to each other by a flexible flat cable or the like wrapped with looseness is adopted.

Here, the flexible flat cable is a plurality of thin conductor parts coated by resin or the like. In general, the flexible flat cable and an external electrical component are connected via a connecting tool shown in Patent Documents 1 to 3.

As shown in Patent Document 1 and Patent Document 2, the connecting tool includes a plurality of bus bars (pin terminals) made of metal and an insulating part (a supporting member) made of resin. In Patent Document 1 and 2, insertion holes are formed on a side surface of the insulating part, and the bus bars can be fixed by inserting (press-fitting) the bus bars into the insertion holes.

In Patent Document 3, firstly, bus bars (pin terminals) are caulked and connected to covered electric wires. Then, the bus bars are fixed by inserting the caulked bus bar into an insulating part (a supporting member) made of resin.

PRIOR-ART DOCUMENTS

Patent Documents

PATENT DOCUMENT 1: Japanese Patent Application Laid-Open No. 2012-182072
PATENT DOCUMENT 2: Japanese Utility Model Registration No. 3183930
PATENT DOCUMENT 3: Japanese Patent Application Laid-Open No. 2013-187150

SUMMARY OF THE INVENTION

Problems to be Solved by the Invention

However, in the connecting tool for fixing the bus bar by inserting the bus bar into an insertion hole as described in Patent Documents 1 to 3, since it is necessary that the insertion holes are formed in an insulating part, a configuration of the insulating part is complicated. Therefore, a die for molding the insulating part is complicated, which leads to an increase in the cost of the insulating part. The accuracy of size of the insertion holes in the insulating part is required for the connecting tool configured to fix the bus bars by inserting the bus bars into the insertion holes, which also leads to an increase in the cost.

The present invention has been made in view of the circumstances described above, and a main object of the present invention is to provide a cable connecting structure for connecting bus bars and an insulating part with a simple configuration.

Means for Solving the Problems and Effects Thereof

Problems to be solved by the present invention are as described above, and next, means for solving the problems and effects thereof will be described.

A first aspect of the present invention provides a cable connecting structure configured as follows. That is, the cable connecting structure includes a plurality of bus bars, a flat cable, and an insulating part. The flat cable is connected to the bus bars. The insulating part has bus bar mounting grooves for arranging each of the bus bars individually and a bus bar fixing portion for fixing the bus bars. Each of the bus bars has at least one protrusion that protrudes toward one side in a depth direction of the bus bar mounting groove, the protrusion protruding toward a side where the flat cable is mounted. The flat cable is connected to the protrusions of the bus bars.

Accordingly, not insertion holes for inserting the bus bars into the insulating part but grooves are provided. This can achieve a simple shape of the insulating part. Therefore, since a die for molding the insulating part has a simple configuration, a cost of the insulating part can be reduced. In a case that the bus bars are mounted by using not the insertion holes but the grooves, it is difficult to define positions of the bus bars. This may lead to deterioration in a quality of the connection between the bus bars and the flat cable. In this respect, as described above, providing the protrusions enables the bus bars and the flat cable to surely come in contact with each other. This can prevent deterioration in the quality of the connection.

In the cable connecting structure, the insulating part has bus bar exposing holes for exposing the bus bars. The bus bar exposing holes are formed in positions corresponding to the protrusions of the bus bars, and formed in positions opposite to protruding directions of the protrusions.

Accordingly, the bus bars can be exposed from the insulating part at positions for connecting with the flat cable. Therefore, the flat cable and the bus bars are connected by resistance welding, for example.

In the cable connecting structure, the bus bar fixing portion is a deformed portion so as to crush the insulating part partly. The crushed portion preferably overlaps the bus bars partly.

Accordingly, the bus bars are fixed by crushing the insulating part and thereby there is no need to provide other parts for fixing the bus bars. This can reduce the number of parts.

Preferably, the cable connecting structure is configured as follows. That is, a bending portion which is bent as seen in an arrangement direction of the bus bars is formed in at least one end portion of each of the bus bars. Bus bar restricting parts are formed in the insulating part. The bus bar restricting parts restrict movements of the bus bars by coming in contact with the bending portions.

Accordingly, since the movement of the bus bars can be restricted, a position displacement of the protrusions in the bus bars can be prevented. This can surely connect the bus bars and the flat cable.

Preferably, the cable connecting structure is configured as follows. That is, the bus bar mounting grooves function as a covered electric wire mounting groove for mounting covered electric wires that are connected to the flat cable via the bus bars. The bus bar fixing portion is arranged between a portion where the covered electric wires are mounted and a portion where the flat cable is mounted.

Accordingly, the bus bars can be fixed at a position having no hindrance in both of the connection between the bus bars and the flat cable and the connection between the bus bars and the covered electric wires.

In the cable connecting structure, a core wire storage part and a covering storage part are formed in each of the covered electric wire mounting grooves.

Accordingly, the core wire storage part and the covering storage part are arranged separately from each other, and thereby mounting positions of the covered electric wires can be clearly defined.

In the cable connecting structure, each of the core wire storage parts has a plurality of wall portions for positioning a core wire individually. A core wire exposing hole for exposing the core wire is formed between the wall portions of each of the core wire storage parts.

Accordingly, the core wire and the bus bar can be exposed on one surface and the other surface of the insulating part. Therefore, the core wire and the bus bar can be connected by resistance welding.

In the cable connecting structure, preferably, each of the covering storage parts has a covering fixing part for fixing by fitting the covered electric wires.

This can easily fix the covered electric wires.

Preferably, the cable connecting structure is configured as follows. That is, each of the bus bars has a plurality of protrusions along a longitudinal direction of the bus bars. The insulating part has the bus bar fitting portions in positions corresponding to the protrusions. The bus bar fitting portions are fitted to the protrusions respectively.

Accordingly, even if a position of welding between the bus bar and the flat cable is varied depending on the bus bars, the bus bars having the same type can be used. Since the bus bars and the insulating part are fitted to each other at various positions, a position displacement of the bus bars can be prevented appropriately.

A second aspect of the present invention provides a method for manufacturing a cable connecting structure including a step of mounting bus bars and a flat cable to an insulating part, and further including the following steps. That is, the method for manufacturing the cable connecting structure includes a bus bar arrangement step, a bus bar fixing step, and a flat cable connecting step. In the bus bar arrangement step, the bus bar is arranged in a bus bar mounting groove for arranging the bus bar individually. In the bus bar fixing step, the bus bar arranged in the bus bar mounting groove is fixed by melting a bus bar fixing portion formed integrally with the insulating part. In the flat cable connecting step, the flat cable is connected to protrusions that are formed on the bus bars and protrude toward one side in a depth direction of the bus bar mounting grooves, the protrusions that protrude toward a side where the flat cable is mounted.

Accordingly, not insertion holes but grooves are provided in the insulating part, which can achieve a simple shape of the insulating part. Therefore, since a die for molding the insulating part has a simple configuration, a cost of the insulating part can be reduced. In a case that the bus bars are mounted by using not the insertion holes but the grooves, it is difficult to define positions of the bus bars. This may lead to deterioration in a quality of the connection between the bus bars and the flat cable. In this respect, the bus bars and the flat cable can be surely come in contact with each other by forming the protrusions as described above. This can prevent deterioration in the quality of the connection.

EMBODIMENT FOR CARRYING OUT THE INVENTION

Figure 1:
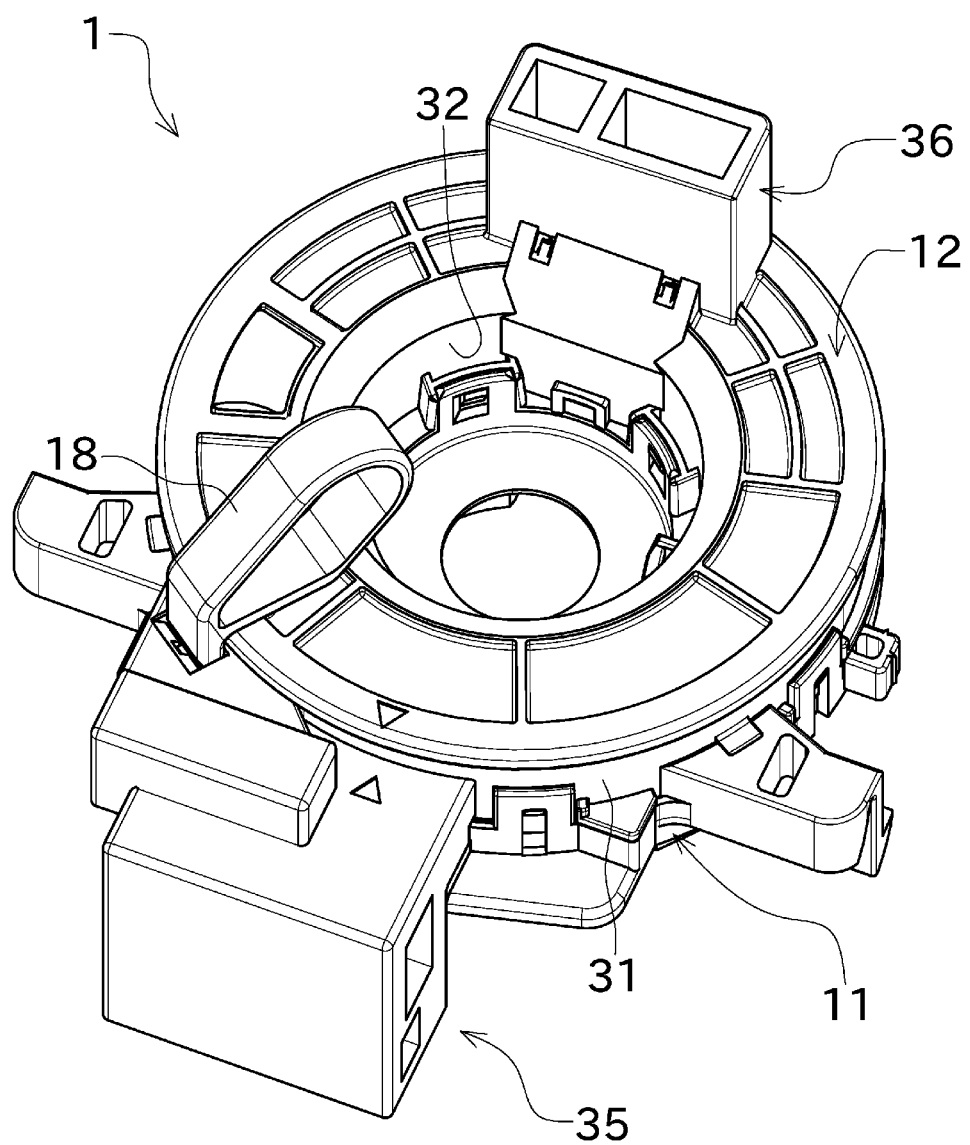
FIG. 1 An external appearance perspective view showing an overall configuration of a rotary connector device including a cable connecting structure according to one embodiment of the present invention.
Figure 2:
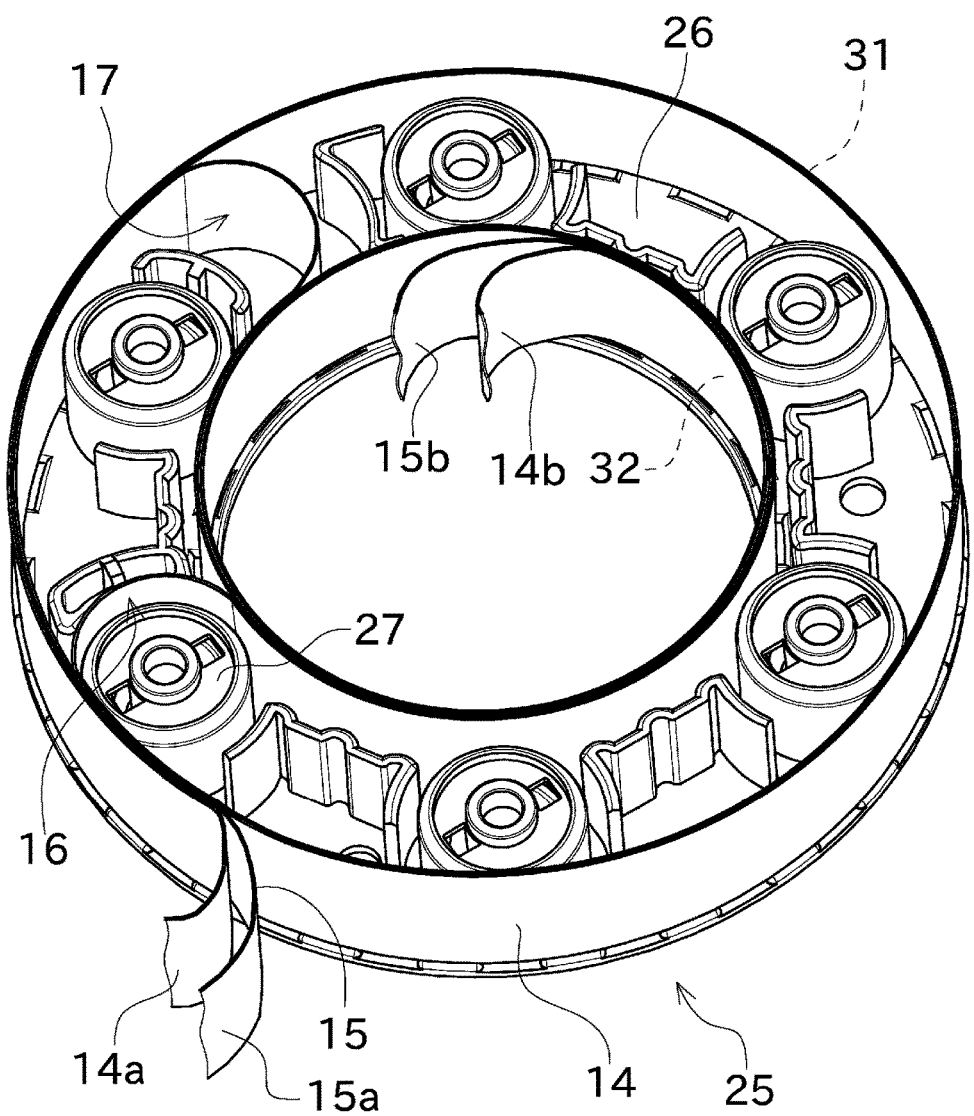
FIG. 2 A perspective view of flexible flat cables and a retainer that are stored in a storage space.

Next, an embodiment of the present invention will be described with reference to the drawings. Firstly, a rotary connector device 1 will be described with reference to FIG. 1 and FIG. 2. The rotary connector device 1 shown in FIG. 1 and FIG. 2 includes a stator 11 and a rotator 12.

The stator 11 is fixed to an appropriate member at a vehicle body side, for example, to a combination switch. The stator 11 is mounted rotatably relative to a steering wheel (not shown). The stator 11 has an outer cylindrical part 31.

The rotator 12 has an inner cylindrical part 32 that receives the steering wheel. The rotator 12 is configured to rotate integrally with the inserted steering wheel and also to rotate relative to the stator 11.

A recess for mounting a fixing pin 18 is formed in the stator 11 and the rotator 12 respectively. The fixing pin 18 is mounted to the recess of the stator 11 and the rotator 12, and thereby the rotator 12 can be locked against rotation relative to the stator 11. The fixing pin 18 is temporarily attached in order to prevent the position of the rotator 12 from being displaced from an intermediate position when the rotary connector device 1 is mounted to a vehicle body. After the rotary connector device 1 is appropriately mounted to the vehicle body, the fixing pin 18 is broken off at the intermediate portion. Thereby, the rotator 12 is made rotatable relative to the stator 11.

A first connector 35 is mounted to the stator 11, and a second connector 36 is mounted to the rotator 12. The second connector 36 is rotated integrally with the rotation of the rotator 12. Each of the first connector 35 and the second connector 36 is configured for connection with a cable (not shown), extending from an external electrical circuit (for example, a horn switch, an airbag module, a power source, or ECU).

A cable storage space that is an annular space is formed between the stator 11 and the rotator 12. Specifically, the cable storage space is surrounded by an outer wall portion of the inner cylindrical part 32 and an inner wall portion of the outer cylindrical part 31. A retainer 25 and two flexible flat cables (flat cables) 14, 15 are stored within the cable storage space. The retainer 25 includes a base ring 26 and a plurality of rotating rollers 27.

The base ring 26 is a plate-like member having an annular shape. The base ring 26 is rotatable around a rotation axis of the rotator 12. The rotating rollers 27 are arranged on one surface side of the base ring 26 at regular intervals in a circumferential direction.

The flexible flat cables 14, 15 are stored in the cable storage space in such a manner that it is wrapped on the base ring 26. First end portions 14a, 15a in two flexible flat cables 14, 15 are connected to a first connector 35.

The flexible flat cables 14, 15 in which are drawn out from the first connector 35 into the cable storage space are partly wrapped at the outer side of the retainer 25 so as to be wrapped along an inner circumferential surface of the outer cylindrical part 31 of the stator 11. Then, in the middle of the wrapping, the flexible flat cables 14, 15 reverse its direction (reversing parts 16, 17) while wrapping around one of the plurality of rotating rollers 27. Thereafter, the flexible flat cables 14, 15 are wrapped at the inner side of the retainer 25 so as to be wrapped along an outer circumferential surface of the inner cylindrical part 32 of the rotator 12, and finally are drawn out from the cable storage space. Second end portions 14b, 15b in two flexible flat cables 14, 15 that are drawn out from the cable storage space are connected to a second connector 36.

In this manner, in the cable storage space, the flexible flat cables 14, 15 are wrapped with loosening having an appropriate length. This length of loosening changes as the rotator 12 rotates relative to the stator 11. The retainer 25 appropriately rotates so as to follow the change in the length of loosening, and thereby enables the flexible flat cables 14, 15 to be always held in an aligned state within the cable storage space.

Accordingly, an air bag module and the like of the steering wheel side (the rotatable-side) and a power source and the like of the vehicle body side (the fixed-side) are electrically connected via the flexible flat cables 14, 15.

Figure 3:
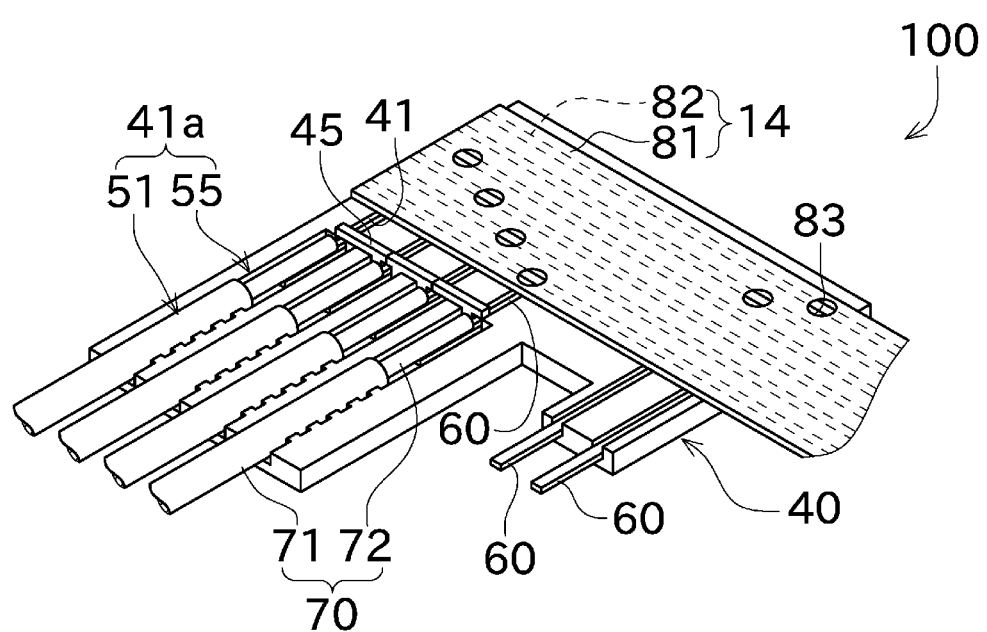
FIG. 3 A perspective view of the cable connecting structure.
Figure 4:
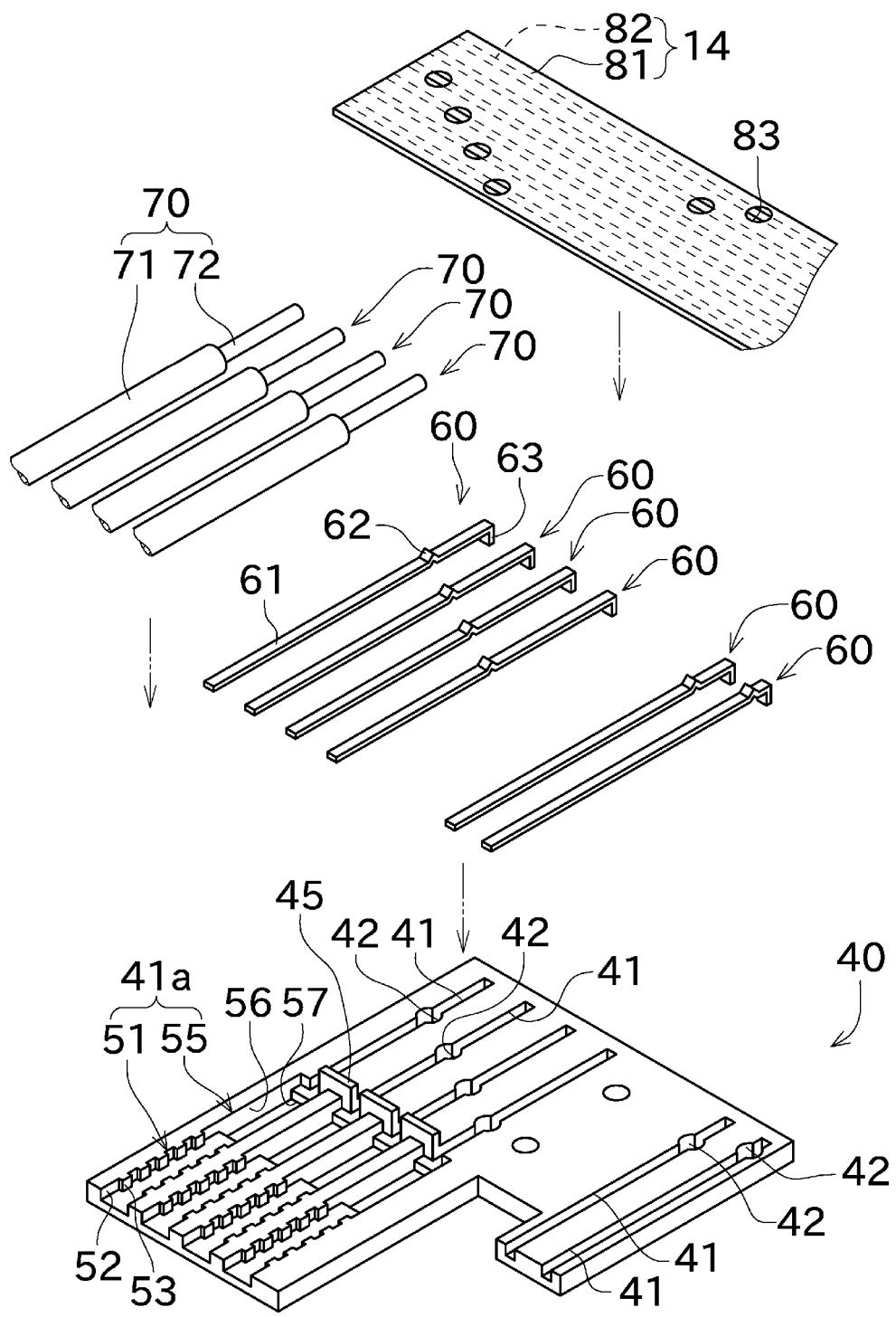
FIG. 4 An exploded perspective view of the cable connecting structure.

Next, a cable connecting structure 100 arranged within the first connector 35 or the second connector 36 will be described with reference to FIG. 3 to FIG. 6. As shown in FIG. 3 and FIG. 4, the cable connecting structure 100 includes an insulating part 40, bus bars 60, covered electric wires 70, and a flexible flat cable 14. The configuration of this embodiment may be applied to a flexible flat cable 15 instead of the flexible flat cable 14.

Each of the bus bars 60 is an elongated member made of a conductive material such as a metal. The cable connecting structure 100 includes a plurality of bus bars 60 (six bus bars in this embodiment). In this embodiment, four bus bars 60 among six bus bars 60 are connected to one of the covered electric wires 70 respectively, and other two bus bars are connected to a terminal (not shown) respectively. As shown in FIG. 4, each of the bus bars 60 has a covered electric wire connecting part 61 and a triangular protrusion (protrusion) 62, and a bending portion 63.

The covered electric wire connecting part 61 is a part positioned in one side (a side of the covered electric wires 70) of a substantially center in the longitudinal direction of the bus bars 60. The covered electric wire connecting part 61 is flat and has no roughness. The bus bars 60 is electrically and mechanically connected to the covered electric wire 70 by the covered electric wire connecting part 61.

Each of the triangular protrusions 62 is formed, one by one, in each of the bus bars 60. Each of the triangular protrusions 62 is formed such that two corners of the triangle are located on the bus bars 60, and other one corner of the triangle is located at an upper side (at one side in a direction vertical to the longitudinal direction of the bus bars 60, at one side in a direction vertical to the arrangement direction of the bus bars 60, and at one side in a depth direction of bus bar mounting grooves 41) of the bus bars 60. Each of the bus bars 60 is electrically and mechanically connected to the flexible flat cable 14 via the triangular protrusion 62.

The bending portion 63 is formed at an end portion of the other side (a side opposite to the covered electric wires 70) in the longitudinal direction of the bus bars 60. The bending portion 63 is a portion where the bus bar 60 is bent vertically to the longitudinal direction of the bus bar 60 (in detail, to a side opposite to the flexible flat cable 14).

Figure 5:
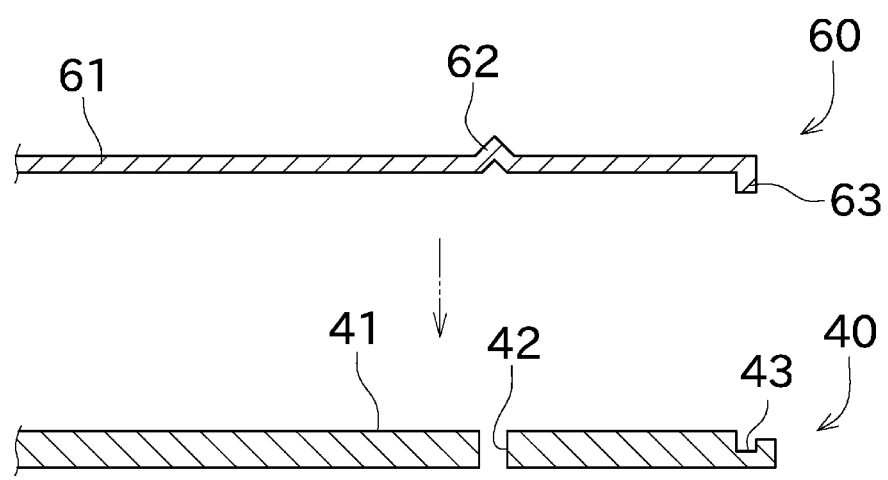
FIG. 5 An end view showing a shape of a bottom surface of a bus bar mounting groove and a shape of a bus bar.
Figure 5:
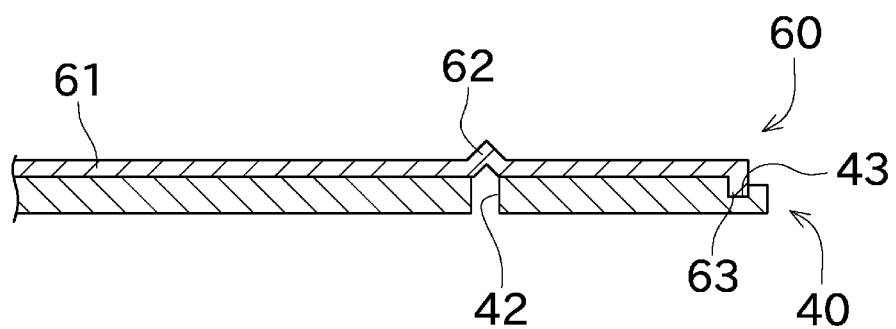

The insulating part 40 made of resin is integrally molded by using a die. As shown in FIG. 4, the insulating part 40 includes the bus bar mounting grooves 41 and bus bar exposing holes 42. FIG. 5 is an end view as seen in the arrangement direction of the bus bars 60.

The bus bar mounting grooves 41 are grooves for mounting the plurality of bus bars 60. In this embodiment, since six bus bars 60 are arranged, each of the bus bar mounting grooves 41 is formed at six positions. Each of the bus bar mounting grooves 41 is open at an upper side thereof (in the direction vertical to the longitudinal direction of the bus bars 60, and in the direction vertical to the arrangement direction of the bus bars 60). Conventionally, each of the bus bars is mounted by inserting the bus bar into one of the insertion holes formed in the insulating part (that is, by moving the bus bars along the longitudinal direction). In this respect, in this embodiment, each of the bus bars 60 is moved vertically to the longitudinal direction (parallelly to the depth direction of the bus bar mounting grooves 41), and thereby each of the bus bars 60 is put in the insulating part 40 (in detail, in one of the bus bar mounting grooves 41), as shown in FIG. 4.

This configuration allows the work of arrangement of the bus bars 60 to be simple. In addition, the shape of the insulating part 40 can be simple and also the die can be simple, which can reduce the manufacturing cost. The depth direction of the bus bar mounting grooves 41 means a concept including the direction directing toward a bottom surface of the bus bar mounting grooves 41 from a surface of the insulating part 40, and its opposite direction. The depth direction of the bus bar mounting grooves 41 is coincident with the direction of insertion of the bus bars 60.

Figure 6:
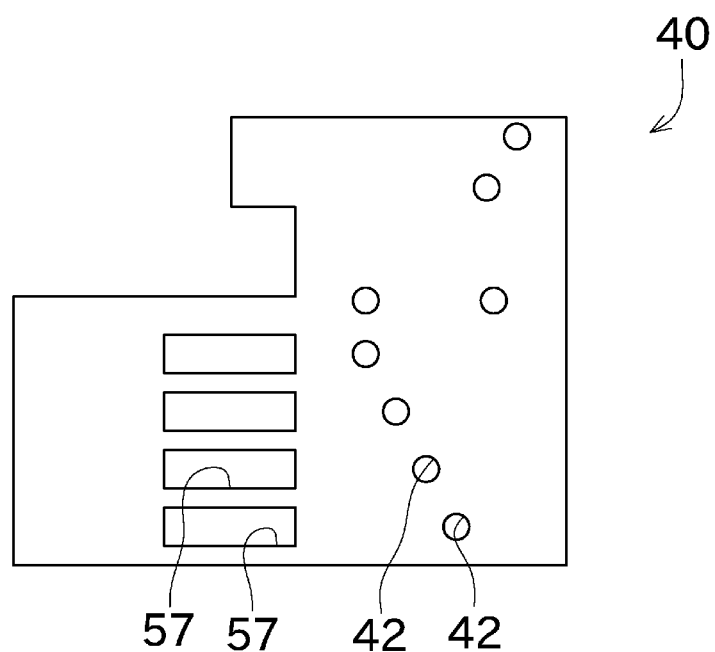
FIG. 6 A bottom view showing bus bar exposing holes and core wire exposing holes that are formed in an insulating part.

As shown in FIG. 5 and FIG. 6, each of the bus bar mounting grooves 41 has the bus bar exposing hole 42 and a bus bar restricting part 43. Specifically, one bus bar exposing hole 42 is formed in each of the bus bar mounting grooves 41 respectively. The bus bar restricting part 43 is formed at an end portion of the bus bar mounting grooves 41.

The bus bar exposing hole 42 is a circular hole penetrating therethrough. The diameter of the bus bar exposing hole 42 is larger than the width of the bus bar mounting grooves 41. The bus bar exposing hole 42 allows the bus bars 60 to expose, and thereby the flexible flat cable 14 and the bus bars 60 are welded by resistance welding (details will be described later). As shown in FIG. 3, the bus bars 60 and the flexible flat cable 14 are welded in a state where they are intersected one another. Therefore, a position where the bus bar exposing holes 42 are formed is varied depending on the bus bar mounting grooves 41. Specifically, the bus bar exposing holes 42 are formed respectively in a position corresponding to a position where the triangular protrusions 62 (and windows 83 (details will be described later)) are formed.

The bus bar restricting part 43 is a recess that is formed near an end portion of the bus bar mounting grooves 41. The bus bar restricting part 43 is configured to receive the bending portion 63 of the bus bars 60. The bus bar restricting part 43 comes in contact with the bending portion 63, which can restrict each of the bus bars 60 so as not to move along the longitudinal direction. In addition, the bus bar restricting part 43 functions to define a position of the bus bars 60.

As shown in FIG. 4, the bus bar fixing portion 45 is formed near a center of the insulating part 40. The bus bar fixing portion 45 that is a portion vertically protruding from a surface of the insulating part 40 is formed near the bus bar mounting grooves 41. The operator performs the operations that a processing tool with high temperature is come in contact with the bus bar fixing portion 45 and further pushed toward a lower side after the bus bars 60 are mounted to the bus bar mounting grooves 41. This can deform the bus bar fixing portion 45 so as to lower (crush) the height of the bus bar fixing portion 45. As a result, since opening portions of the bus bar mounting grooves 41 and the bus bars 60 are overlapped with the bus bar fixing portion 45, the bus bars 60 can be fixed to the insulating part 40 (see FIG. 3).

The bus bar mounting grooves 41 function as (include) covered electric wire mounting grooves 41a for mounting the covered electric wires 70. Each of the covered electric wire mounting grooves 41a has a covering storage part 51 for storing a covering 71 of the covered electric wire 70, and a core wire storage part 55 for storing a core wire 72 of the covered electric wire 70.

A covering fixing part 53 is formed on a wall portion 52 of the covering storage part 51. The covering fixing part 53 is shaped into concavity and convexity that protrude toward the inside from the wall portion 52 (so as to approach toward an opposing core wire exposing hole 57). Since the covering 71 is made of resin, the covering 71 can be fixed to the insulating part 40 by the operator's operation that the covering 71 is pushed to the covering fixing part 53.

As shown in FIG. 4 and FIG. 6, each of the core wire exposing holes 57 is formed between the wall portions 56 of the core wire storage part 55. The core wire exposing hole 57 is formed through a vertical direction (a direction of insertion of the bus bars 60). Accordingly, the bus bars 60 and the core wires 72 can be welded by resistance welding after the bus bars 60 and the covered electric wires 70 are set in the insulating part 40.

After the bus bars 60 and the covered electric wires 70 are mounted to the insulating part 40 and welded, the operator sets the flexible flat cable 14 on the insulating part 40. Here, the flexible flat cable 14 includes a covering part 81 and conductor parts 82 arranged side by side. The windows 83 for exposing the conductor parts 82 are formed on the covering part 81. Each of the windows 83 corresponds to one of the bus bar exposing holes 42.

The operator performs the operation of setting of the flexible flat cable 14, and then the windows 83 side of the flexible flat cable 14 and the bus bar exposing holes 42 side of the insulating part 40 are sandwiched by a tool for resistance welding. This can electrically and mechanically connect between the bus bars 60 and the flexible flat cable 14. As such, in this embodiment, the operations of mounting of the bus bars 60, connecting of the covered electric wires 70, and connecting of the flexible flat cable 14 can be performed in a series of flow.

As described above, the cable connecting structure 100 of this embodiment includes the plurality of bus bars 60, the flexible flat cable 14, and the insulating part 40. The flexible flat cable 14 is connected to the bus bars 60. The insulating part 40 has the bus bar mounting grooves 41 for arranging the bus bars 60 individually, and has the bus bar fixing portion 45 for fixing the bus bars 60 by overlapping the bus bars 60. Each of the bus bars 60 has the triangular protrusion 62 that protrudes toward one side in the depth direction of the bus bar mounting grooves 41. Each of the triangular protrusions 62 protrudes toward the side where the flexible flat cable 14 is mounted. The flexible flat cable 14 is connected to the triangular protrusions 62 of the bus bars 60.

Accordingly, a simple shape of the insulating part 40 can be achieved. Therefore, since a die for molding the insulating part 40 has a simple configuration, a cost of the insulating part 40 can be reduced. The triangular protrusion 62 is formed in the bus bars 60 and thereby the bus bars 60 can be surely connected to the flexible flat cable 14. This can improve the quality of the connection.

In the cable connecting structure 100 of this embodiment, the insulating part 40 has the bus bar exposing holes 42 for exposing the bus bars 60 in positions corresponding to the triangular protrusions 62 of the bus bars 60. The bus bar exposing holes 42 are formed in positions opposite to protruding directions of the triangular protrusions 62.

Accordingly, the bus bars 60 can be exposed from the insulating part 40 at a position for connecting with the flexible flat cable 14. Therefore, the flexible flat cable 14 and the bus bars 60 are connected by resistance welding.

In the cable connecting structure 100, the bus bar fixing portion 45 is a deformed portion so as to crush the insulating part 40 partly. The crushed portion overlaps the bus bars 60 partly.

Accordingly, the bus bars 60 are fixed by crushing the insulating part 40 and thereby there is no need to provide other parts for fixing the bus bars 60. This can reduce the number of parts.

In the cable connecting structure 100, a bending portion 63 which is bent as seen in an arrangement direction of the bus bars 60 is formed in at least one end portion of each of the bus bars 60. The bus bar restricting parts 43 are formed in the insulating part 40. The bus bar restricting parts 43 restrict movements of the bus bars 60 by coming in contact with the bending portions 63.

Accordingly, since the movement of the bus bars 60 can be restricted, a position displacement of the triangular protrusions 62 in the bus bars 60 can be prevented. This can surely connect the bus bars 60 and the flexible flat cable 14.

In the cable connecting structure 100, the bus bar mounting grooves 41 function as the covered electric wire mounting grooves 41a for mounting the covered electric wires 70 that are connected to the flexible flat cable 14 via the bus bars 60. The bus bar fixing portion 45 is positioned between a portion where the covered electric wires 70 are mounted and a portion where the flexible flat cable 14 is mounted.

Accordingly, the bus bars 60 can be fixed at a position having no hindrance in both of the connection between the bus bar 60 and the flexible flat cable 14, and the connection between the bus bar 60 and the covered electric wires 70.

In the cable connecting structure 100 of this embodiment, each of the covered electric wire mounting grooves 41a has the core wire storage part 55 and the covering storage part 51.

Accordingly, the core wire storage part 55 and the covering storage part 51 are arranged separately from each other, and thereby a mounting position of the covered electric wires 70 can be clearly defined.

In the cable connecting structure 100 of this embodiment, each of the core wire storage parts 55 has the plurality of wall portions 56 for positioning the core wire 72 individually. The core wire exposing hole 57 for exposing the core wire 72 is formed between the wall portions 56 of each of the core wire storage parts 55.

Accordingly, the core wire and the bus bars 60 can be exposed on one surface and the other surface of the insulating part 40. Therefore, the core wire 72 and the bus bars 60 can be connected by resistance welding.

In the cable connecting structure 100 of this embodiment, each of the covering storage parts 51 has the covering fixing part 53 for fixing by fitting the covered electric wires 70.

This can easily fix the covered electric wires.

Figure 7:
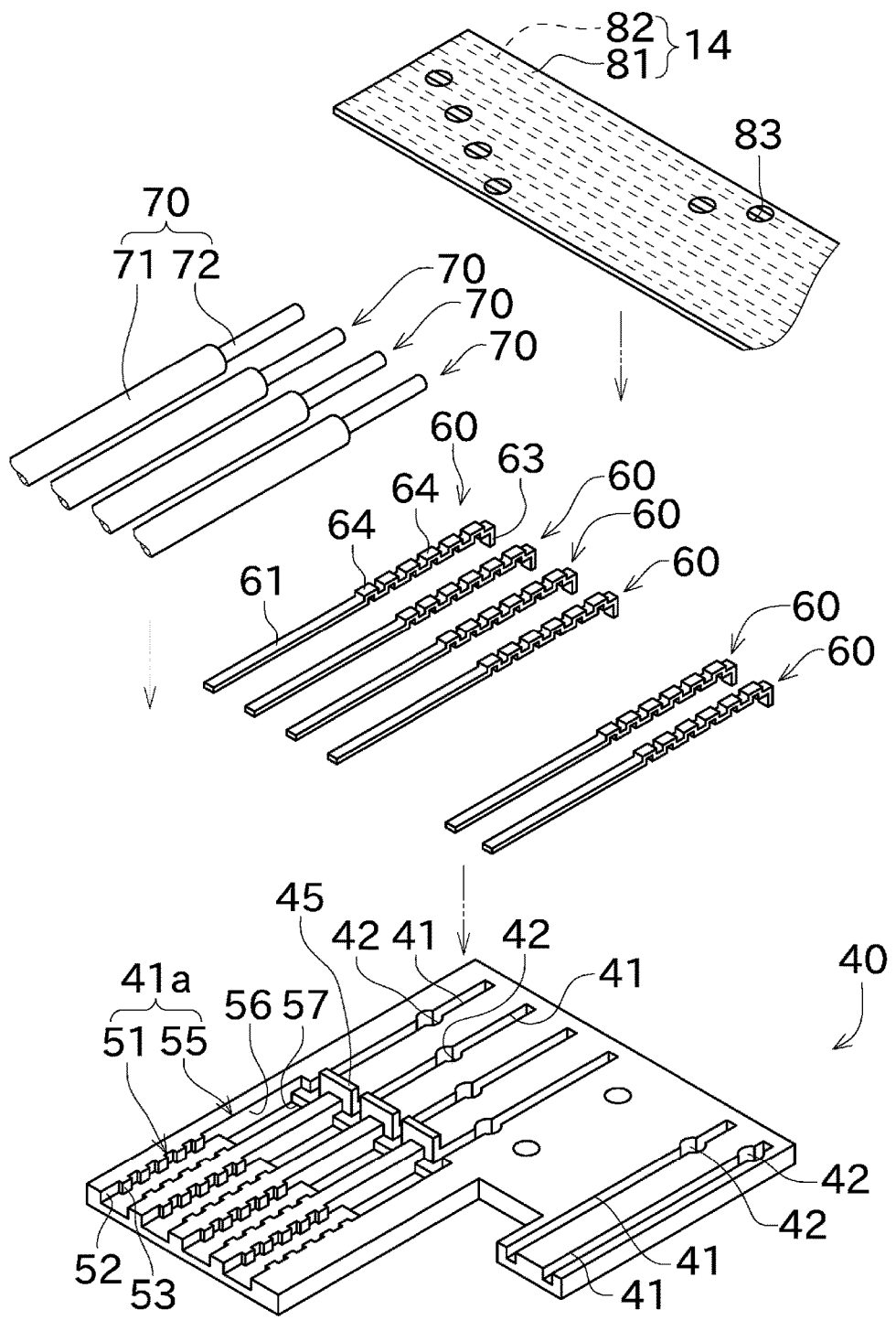
FIG. 7 An exploded perspective view of a cable connecting structure according to a first modification.

Next, a first modification of the above-described embodiment will be described with reference to FIG. 7 and FIG. 8.

In the first modification, shapes of the bus bar mounting grooves 41 and the bus bars 60 are different from the shapes thereof in the above-described embodiment. Specifically, as shown in FIG. 8, the bus bar exposing holes 42 or bus bar fitting portions 44 are formed on a bottom of the bus bar mounting grooves 41 at regular intervals along the longitudinal direction of the bus bar mounting grooves 41. Each of the bus bar fitting portions 44 is a portion that protrudes toward the bus bars 60 from the bottom of the bus bar mounting grooves 41. Each of the bus bar exposing holes 42 is formed at only one portion for each one of the bus bar mounting grooves 41.

In the bus bars 60 of the first modification, a plurality of vertical protrusions 64 is formed at regular intervals along the longitudinal direction of the bus bars 60. Each of the vertical protrusions 64 is a portion where the bus bars 60 is bent vertically to one side (one side vertical to the longitudinal direction and the arrangement direction of the bus bars 60) and the other side. Each of the vertical protrusions 64 is formed at intervals equal to the above-described bus bar exposing holes 42 or the bus bar fitting portions 44. To be specific, positions of the grooves in the bus bar mounting grooves 41 (in the bottom surface) formed by the vertical protrusions 64 correspond to positions of the bus bar fitting portions 44 (positions of protruding portions), and the vertical protrusions 64 and the bus bar fitting portions 44 can be fitted to each other.

The operator performs the operation that, when the bus bars 60 are entered in the insulating part 40, the bus bars 60 are attached to the bus bar mounting grooves 41 such that the grooves in the bottom surface of the vertical protrusions 64 are fitted to the bus bar fitting portions 44 and the bending portion 63 comes into the bus bar restricting part 43. Accordingly, the bus bars 60 can be attached at appropriate positions and the position displacement can be prevented.

As such, the plurality of vertical protrusions 64 are formed in each of the bus bars 60 and the shape of the insulating part 40 is defined in accordance with the vertical protrusions 64. This can commonalize the bus bars 60.

Figure 8:
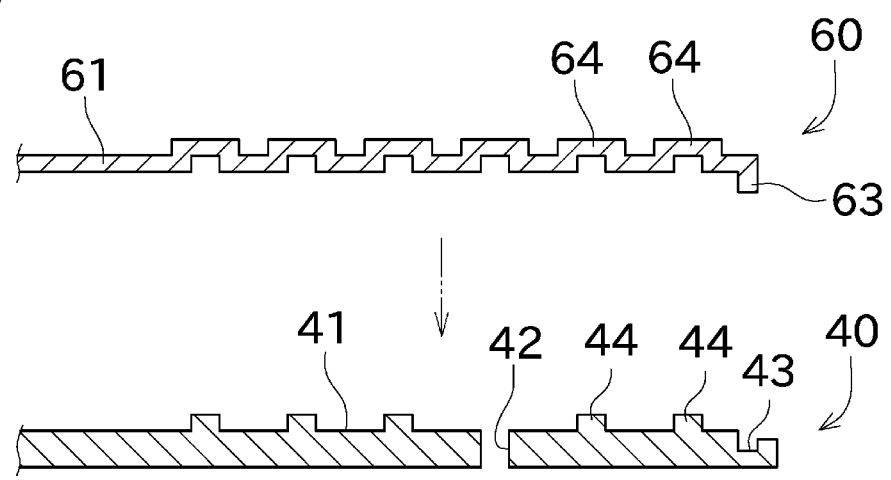
FIG. 8 An end view showing a shape of a bottom surface of a bus bar mounting groove and a shape of a bus bar according to the first modification.
Figure 8:
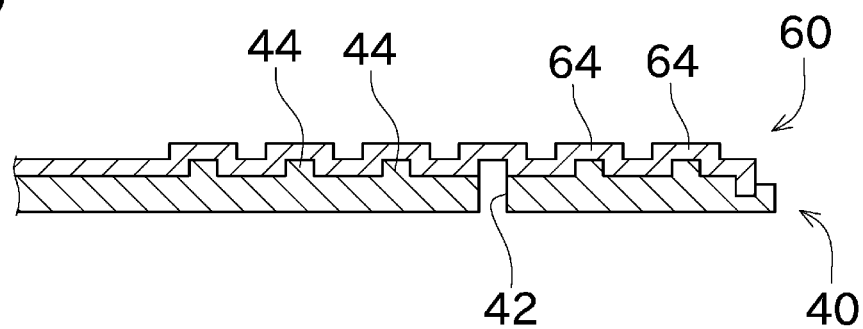

Therefore, as shown in FIG. 8, the common type of bus bars 60 can be used in the embodiment in which a welding position of the flexible flat cable 14 is varied depending on the bus bars 60. The bus bars 60 and the insulating part 40 are fitted to each other at various positions. This can more preferably prevent the position displacement of the bus bars 60.

Next, a second modification to fourth modification will be described with reference to FIG. 9.

Figure 9:
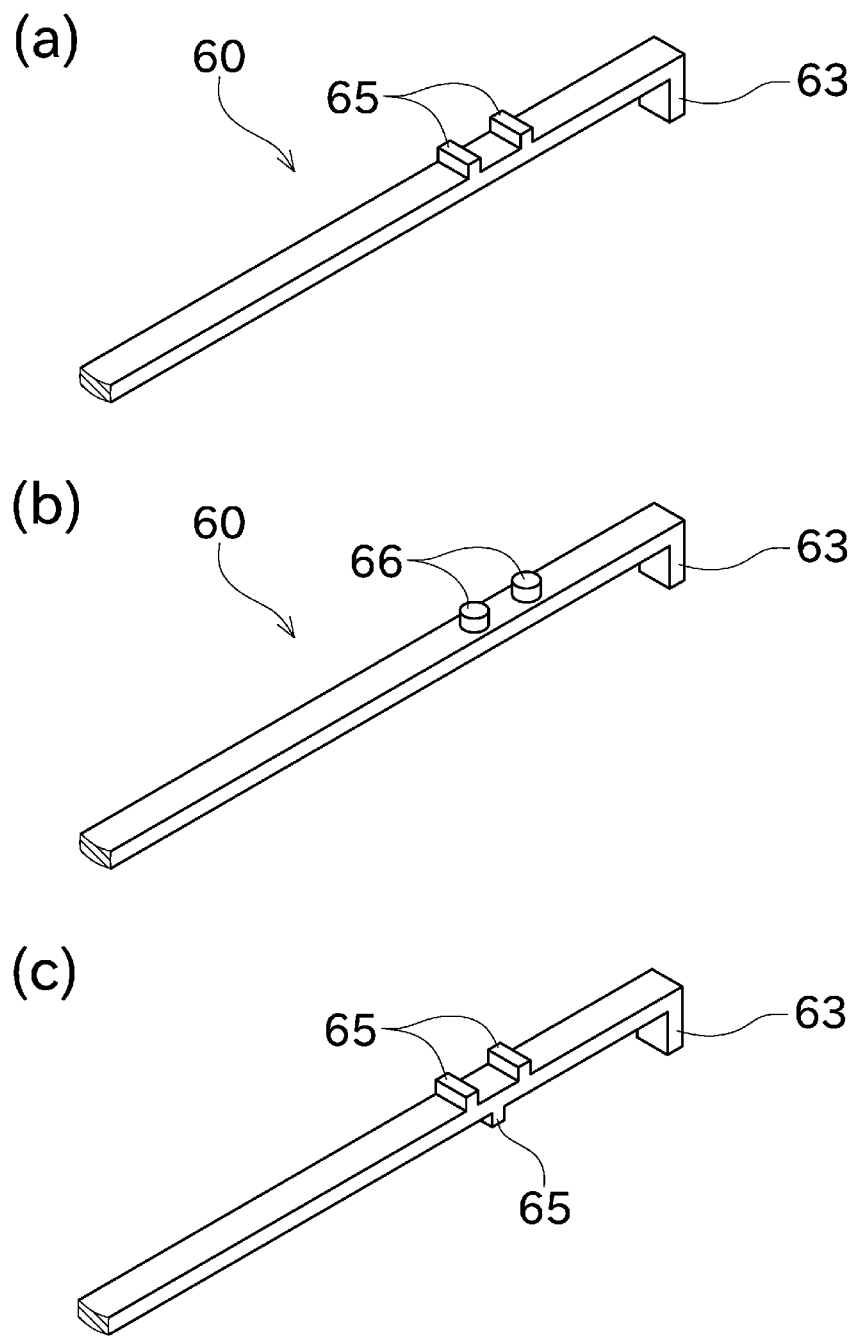
FIG. 9 A perspective view showing shapes of the bus bars according to a second modification to fourth modification.

FIG. 9 (a) shows a bus bar 60 according to the second modification. The bus bar 60 according to the second modification has cuboid protrusions (protrusions) 65 that are shaped into cuboids and protrude upward. Grooves or protrusions are not formed on a lower surface of the bus bar 60 according to the second modification.

FIG. 9 (b) shows a bus bar 60 according to a third modification. The bus bar 60 according to the third modification has columnar protrusions (protrusions) 66 that are shaped into columns and protrude upward. Grooves or protrusions are not formed on a lower surface of the bus bar 60 according to the third modification.

FIG. 9 (c) shows the bus bar 60 according to the fourth modification. The bus bar 60 according to the fourth modification has the cuboid protrusions 65 on the upper surface and the lower surface of the bus bar 60. A groove for fitting to the cuboid protrusion 65 is formed on the bottom of the bus bar mounting groove 41 that correspond to the cuboid protrusion 65 formed on the lower surface of the bus bar 60.

Although a preferred embodiment of the present invention has been described above, the above-described configuration may be modified, for example, as follows.

Any number of the triangular protrusion 62 of the above-described embodiment, the vertical protrusion 64 of the first modification, the cuboid protrusion 65 of the second and forth modification, and the columnar protrusion 66 of the third modification may be formed. The number thereof may be one, two or more (for example, the same number as that of the bus bar exposing holes 42). Any shape of the lower surface of the bus bars 60 may be also acceptable.

In the above-described embodiment, resistance welding is represented as a method for welding the covered electric wires 70 and the flexible flat cable 14 to the bus bars 60, however, other connecting method such as ultrasonic welding or laser welding may be used.

In the above-described embodiment, the width of the bus bar 60 is constant, however, the bus bar having a large width in an intermediate portion or the like may be adoptable.

In the above-described embodiment, the bus bars 60 are fixed by melting a protruding resin (the bus bar fixing portion 45), however, the bus bars 60 may be fixed by using other parts.

In the above-described embodiment, the covered electric wires 70 and the terminals are connected to the bus bars 60, however, only the covered electric wires 70 may be connected to the bus bars 60 or only the terminals may be connected to the bus bars 60.

The shape, number, position and the like of the parts are merely illustrative, and can be changed as appropriate, in addition to the above-described configuration.

DESCRIPTION OF THE REFERENCE NUMERALS 1 rotary connector device
14, 15 flexible flat cable (flat cable)
40 insulating part
41 bus bar mounting groove 42 bus bar exposing hole
43 bus bar restricting part
44 bus bar fitting portion
45 bus bar fixing portion
60 bus bar
61 covered electric wire connecting part
62 triangular protrusion
63 bending portion
70 covered electric wire
100 cable connecting structure

The invention claimed is:

1. A cable connecting structure comprising:
a plurality of bus bars;
a flat cable connected to the plurality of bus bars; and
an insulating part having bus bar mounting grooves and a bus bar fixing portion, the bus bar mounting grooves for arranging the plurality of bus bars individually, the bus bar fixing portion for fixing the plurality of bus bars by overlapping the plurality of bus bars, wherein
each of the plurality of bus bars has at least one protrusion that protrudes toward one side in a depth direction of a corresponding bus bar mounting groove, the at least one protrusion protruding toward a side where the flat cable is mounted,
the flat cable is connected to the at least one protrusion of the plurality of bus bars,
a bending portion that is bent as seen in an arrangement direction of the plurality of bus bars is formed in at least one end portion of each of the plurality of bus bars, and
the insulating part has bus bar restricting parts that restrict movements of the plurality of bus bars by coming in contact with the bending portion.

2. The cable connecting structure according to claim 1, wherein
the insulating part has bus bar exposing holes for exposing the plurality of bus bars, the bus bar exposing holes are formed in positions corresponding to protrusions of the plurality of bus bars, the bus bar exposing holes are formed in positions opposite to protruding directions of the protrusions.

3. The cable connecting structure according to claim 1, wherein
the bus bar fixing portion is a deformed portion so as to crush the insulating part partly, wherein the crushed portion overlaps the plurality of bus bars partly.

4. The cable connecting structure according to claim 1, wherein
the bus bar mounting grooves function as covered electric wire mounting grooves for mounting covered electric wires that are connected to the flat cable via the plurality of bus bars,
the bus bar fixing portion is arranged between a portion where the covered electric wires are mounted and a portion where the flat cable is mounted.

5. The cable connecting structure according to claim 4, wherein
each of the covered electric wire mounting grooves has a core wire storage part and a covering storage part.

6. The cable connecting structure according to claim 5, wherein
each of the core wire storage parts has a plurality of wall portions for positioning a core wire individually,
a core wire exposing hole for exposing the core wire is formed between the wall portions of each of the core wire storage parts.

7. The cable connecting structure according to claim 5, wherein
each of the covering storage parts has a covering fixing part for fixing by fitting the covered electric wires.

8. The cable connecting structure according to claim 4, wherein
each of the plurality of bus bars has a plurality of protrusions along a longitudinal direction of the plurality of bus bars,
the insulating part has bus bar fitting portions in positions corresponding to the plurality of protrusions,
the bus bar fitting portions are fitted to the plurality of protrusions respectively.

9. The cable connecting structure according to claim 1, wherein the bus bar restricting parts are recesses that are formed near an end portion of the bus bar mounting grooves.

10. The cable connecting structure according to claim 1, wherein a bus bar restricting part from the bus bar restricting parts is configured to receive the bending portion.

11. A method for manufacturing a cable connecting structure having a step of mounting at least bus bars and a flat cable to an insulating part, the method comprising:
a bus bar arrangement step of arranging the bus bars in bus bar mounting grooves for arranging the bus bars individually;
a bus bar fixing step of fixing the bus bars arranged in the bus bar mounting grooves by melting a bus bar fixing portion that is formed integrally with the insulating part;
a flat cable connecting step of connecting the flat cable to protrusions that are formed on the bus bars and protrude toward one side in a depth direction of the bus bar mounting grooves, and the protrusions that protrude toward a side where the flat cable is mounted; and
a bending portion step of bending a portion of the cable connecting structure that is bent as seen in an arrangement direction of the bus bars and is formed in at least one end portion of each of the bus bars, wherein
the insulating part has bus bar restricting parts that restrict movements of the bus bars by coming in contact with the portion.

12. The method according to claim 11, wherein the bus bar restricting parts are recesses that are formed near an end portion of the bus bar mounting grooves.

13. The method according to claim 11, wherein a bus bar restricting part from the bus bar restricting parts is configured to receive the bending portion.

* * * * *